United States Patent
Sisk et al.

(10) Patent No.: US 6,289,931 B1
(45) Date of Patent: Sep. 18, 2001

(54) CYCLE REVERSING VALVE FOR USE IN HEAT PUMPS

(75) Inventors: Gregory Edward Sisk, Farmington; George J. Sciuto; Thomas Hopkins, both of St. Louis, all of MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/487,864

(22) Filed: Jan. 19, 2000

(51) Int. Cl.$^7$ ........................................ F16K 11/02
(52) U.S. Cl. ............................................. 137/625.43
(58) Field of Search ................................ 137/625.43

(56) References Cited

U.S. PATENT DOCUMENTS

| | | |
|---|---|---|
| 2,388,890 * | 11/1945 | Whitted ........................ 137/625.43 |
| 2,927,606 | 3/1960 | Matchett, Jr. et al. . |
| 2,969,655 | 1/1961 | Salter . |
| 2,976,701 | 3/1961 | Greenawalt . |
| 2,983,286 | 5/1961 | Greenawalt et al. . |
| 3,032,312 | 5/1962 | Greenawalt . |
| 3,039,491 | 6/1962 | Raney . |
| 3,056,574 | 10/1962 | Greenawalt . |
| 3,111,960 | 11/1963 | Marmo . |
| 3,680,788 | 8/1972 | Cox . |
| 3,897,043 | 7/1975 | McBain et al. . |
| 3,952,537 | 4/1976 | Aoki et al. . |
| 3,985,154 | 10/1976 | Hargraves . |
| 4,025,050 | 5/1977 | Manki et al. . |
| 4,176,823 | 12/1979 | Gliatas . |
| 4,200,258 | 4/1980 | Gliatas . |
| 4,203,469 * | 5/1980 | Gates ............................ 137/625.43 |
| 4,213,483 | 7/1980 | Bauer . |
| 4,255,939 | 3/1981 | Ou . |
| 4,318,425 | 3/1982 | Marks . |
| 4,340,202 | 7/1982 | Hargraves et al. . |
| 4,469,134 | 9/1984 | Kanai et al. . |
| 4,492,252 | 1/1985 | Kanai . |
| 4,506,703 * | 3/1985 | Baron ............................ 137/625.43 |
| 4,573,497 | 3/1986 | White . |
| 4,644,760 | 2/1987 | Aoki et al. . |
| 4,712,582 | 12/1987 | Marks . |
| 4,760,709 | 8/1988 | Aoki et al. . |
| 4,966,194 | 10/1990 | Nakatsukasa et al. . |
| 5,507,315 | 4/1996 | Parker . |

OTHER PUBLICATIONS

Brochure, P.E. Valve Company, Inc., Asheville, N.C. "Features That Make PE Valves Extra Dependable and Energy Efficient" (Date unknown), pp. 1–2.

* cited by examiner

*Primary Examiner*—John Fox
(74) *Attorney, Agent, or Firm*—Harness Dickey & Pierce

(57) ABSTRACT

A four port reversing valve for a reversible-cycle refrigeration system having a compressor is constructed with the reversing valve having a first inlet port adapted to be connected to the compressor and second, third, and fourth ports. The four port reversing valve is further provided with a rotatable valve member operable between first and second positions. The valve member in its first position connects the first inlet port with the second port and the third port with the fourth port, and the valve member in its second position connects the first inlet port with the fourth port, and the second port with the third ports. The second and third ports and the third and fourth ports are arranged so that the angle between the ports is greater than about 90°. The third port is preferably oriented at an angle of about 120° with respect to the second and fourth ports, but the third port may also be oriented at an angle of about 135° with respect to the second and fourth ports. The four port reversing valve further comprises a rotating drive mechanism with the valve member magnetically coupled to the rotating drive mechanism. Alternatively, a linked rotary solenoid or hermetic motor can be connected to the valve member.

13 Claims, 3 Drawing Sheets

CYCLE REVERSING VALVE FOR USE IN HEAT PUMPS

FIELD OF THE INVENTION

This invention relates generally to heat pumps, and more particularly, to a cycle reversing valve for use in residential heat pumps.

BACKGROUND OF THE INVENTION

It is well known to use cycle reversing valves to control the operation of heat pumps. These valves, often referred to as "four way valves" or "switch over valves", are used to reverse the refrigerant line connections to a compressor, such that the heat pump can either pump heat into or out from a building (e.g., a house).

Cycle reversing valves for use in heat pumps typically are provided with a flow plate through which there are port passages. Flow is controlled by a "bathtub" which moves to cover and uncover ports in the flow plate. The bathtub shape requires an abrupt 180 degree turn of the suction flow. However, the "bathtub" causes a loss of efficiency or SEER loss. This loss occurs through the suction gas line and the discharge gas line of the heat pump and from heat transfer. In particular, suction gas loss results from the restriction in the flow plate and the 180° bend of the bath tub. The discharge gas loss results from abrupt changes in expansion and contraction, as well as from the flow path of the discharge line. Cold suction gas inside the "bathtub", which is surrounded by hot discharge gas, causes heat transfer loss.

Numerous patents are directed to reversing valves which attempt to improve the efficiency of the heat pump and/or simplify its operation by modifying the structure and configuration of the valve member. These valves include ones providing control for the opening or shutting the discharge and suction ports through direction of pressure differential between the high and low side of the system. Other valves use complex switching and control elements, which may include numerous springs, cylinders and pistons, in an attempt to improve the efficiency of the heat pump. Still other valve designs attempted to modify the valve member itself, for example, by providing a butterfly valve, to increase efficiency and simplify construction. Still other valve structures included multiple chambers or multiple valves in an attempt to simplify the design or increase efficiency of the reversing valve.

Overall, the known reversing valves do not sufficiently reduce or limit the losses that occur in heat pumps. Therefore, what was needed was a new reversing valve to reduce or limit efficiency loss, while providing a less complex design for controlling and/or shifting the reversing valve, which had fewer component parts.

BRIEF SUMMARY OF THE INVENTION

The cycle reversing valve of the present invention provides a simple valve design, having few component parts, which provides a direct path through the valve for the suction gas, thereby increasing the efficiency of the system in which the valve is used. The cycle reversing valve of the present invention also provides improved segregation of the gasses within the valve, thereby lowering heat transfer losses.

Generally, the cycle reversing valve provides gas flow paths that provide more efficient and smooth communication of gas than the standard contraction/restriction and 180 degree bend of known reversing valves. Additionally, magnetic coupling provides for control of the valve member, thereby eliminating braze leak paths and problems with external capillary tubes. Further, because the valve member is not dependent on pressure to provide shifting, problems with valve sizing are eliminated.

According to one aspect of the present invention, a four port reversing valve for a reversible-cycle refrigeration system having a compressor is constructed with the reversing valve having a first inlet port adapted to be connected to the compressor and second, third, and fourth ports, and further, having a rotatable valve member operable between first and second positions. The valve member in its first position connects the first inlet port with the second port and the third port with the fourth port, and the valve member in its second position connects the first inlet port with the fourth port, and the second port with the third port. The second and third ports and the third and fourth ports are arranged so that the angle between the ports is greater than about 90°, more preferably greater than about 120°, and still more preferably greater than about 135°.

The valve member preferably has a smoothly contoured passage therethrough that connects the third port with the fourth port when the valve member is in its first position and that connects the third port with the second port when the valve member is in its second position, to provide a smooth flow path therethrough.

The four port reversing valve further comprises a rotating drive mechanism for rotating the valve member. The valve member is preferably magnetically coupled to the rotating drive mechanism, so that the valve member can be sealed inside the valve. The rotating valve mechanism may be an electric motor, a rotating solenoid, or other suitable drive. Alternatively, the rotating drive mechanism can be connected directly to the valve member. The rotating drive mechanism may be a linked rotary solenoid or hermetic motor While the principal advantages and features of the present invention have been explained above, these and other features and advantages will be in part apparent and in part pointed out in a more detailed description of the various embodiments and aspects of the invention as set out below.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
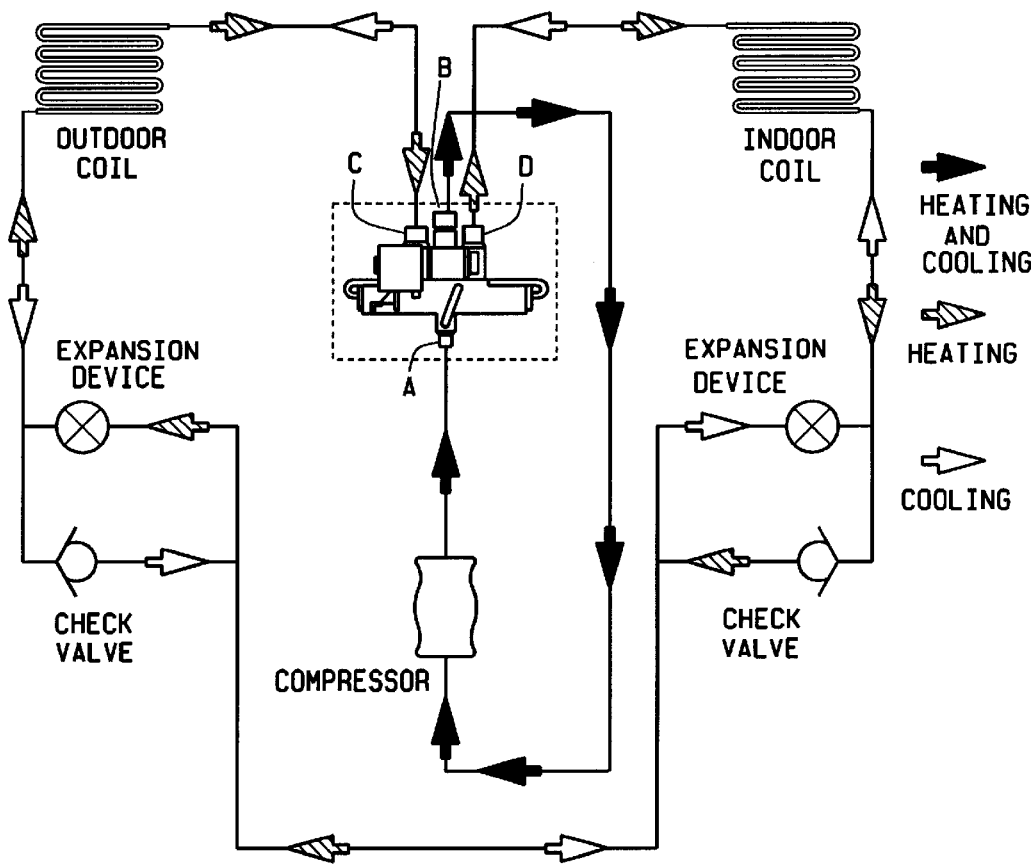
FIG. 1 is a schematic diagram of a typical prior art reversing valve.

A typical prior art reversing valve is shown in FIG. 1. The reversing valve has a high pressure inlet port A, a low pressure return port B, and ports C and D. A shuttle member E slides back and forth so that in one position the inlet port A and the port C are connected and the low pressure return port B and the port D are connected, and in another position (not shown) the inlet port A and the port D are connected and the low pressure return port B and the port C are connected. In either position, flow entering the low pressure return port B is severely necked down, and the direction of flow changes 180°. This results in inefficiencies.

Figure 2:
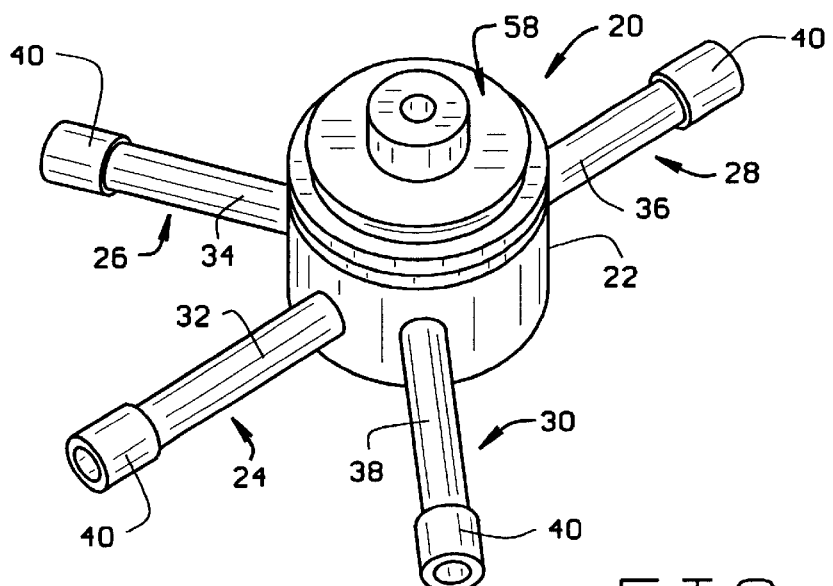
FIG. 2 is a perspective view from above of a reversing valve constructed according to the principles of the present invention.
Figure 3:
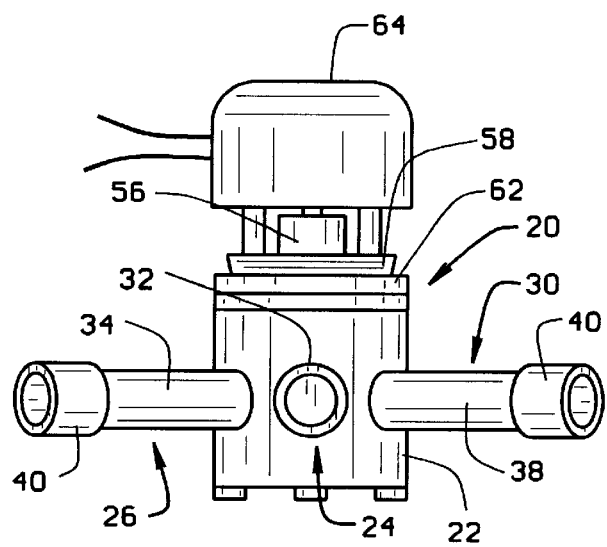
FIG. 3 is a side elevation view of the reversing valve of FIG. 2 with a motor attached.
Figure 4:
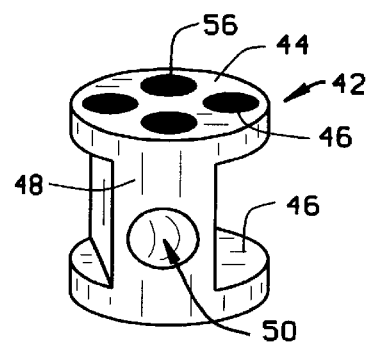
FIG. 4 is a perspective view of a valve member constructed according to the principles of the present invention.

A four port reversing valve constructed according to the principles of the present invention is indicated generally as 20 in FIG. 2. The valve 20 is adapted for use in a reversible cycle refrigeration system having a compressor. The reversing valve 20 comprises a generally cylindrical housing 22, having a first inlet port 24, for connection to the outlet of compressor, a second port 26, a third port 28, for connection to the inlet of the compressor, and a fourth port 30.

The first port 24 includes a tube 32, the second port 26 includes a tube 34, the third port 28 includes a tube 36, and the fourth part 30 includes a tube 38. The pen ends of each of the tubes is closed with a fitting 40.

The housing 22 is preferably constructed of aluminum, brass or steel and the tubes 32, 34, 36 and 38 are preferably copper or aluminum. However, any suitable material may be used.

Figure 8:
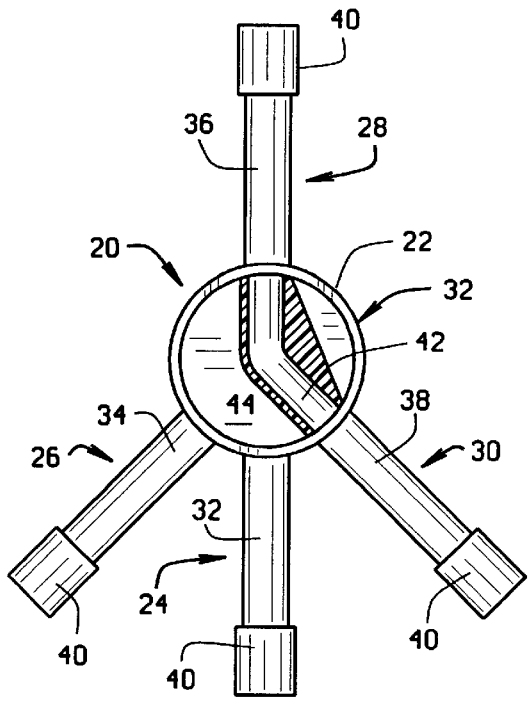
FIG. 8 is a horizontal cross sectional view of the reversing valve of FIG. 2 with the valve member of FIGS. 4 and 7 therein.
Figure 9:
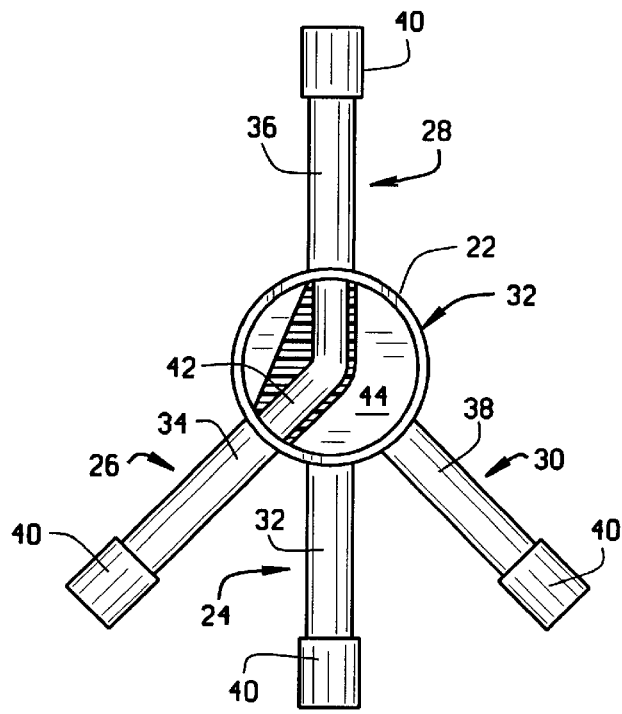
FIG. 9 is a horizontal cross-sectional view of the reversing valve of FIG. 8, with the valve member rotated.

There is a valve member 42 rotably mounted inside the housing 22. The valve member 42 is generally disc shaped having a top panel 44, a bottom panel 46 and a body 48 therebetween. A smoothly contoured passage 50 extends generally transversely through the body 48, with a first end 52 on one side of the body and a second end 54 generally on the other side of the body. The valve member 42 is configured so that in a first position, the first inlet port 24 and the second port 26 communicate and the passage 50 connects the third port 28 and the fourth port 30 (see FIG. 8), and so that in a second position the first inlet port 24 and the fourth port 30 communicate and the passage 50 connects the third port 28 and the second port 26 (see FIG. 9).

The valve member 42 is preferably magnetically driven. The valve member 42 is preferably provided with magnets 56 on its top panel, and sealed in housing 22. A driver 58, with magnets 60 is positioned adjacent the housing 22, over the sealed lid 62, so that the magnets 58 engage the magnets 56 on the valve member 42. This rotation of the driver 58 outside of the housing 22 causes the valve member 42 to rotate inside the housing. A device for rotating the driver 58, such as an electric stepper motor 64 or rotating solenoid, or motor and gear box, rotates the driver and thus the valve member 42. Alternatively the valve member 42 could be directly driven with a motor (such as a hermetic motor) or solenoid inside or outside the housing 22.

These magnets 54 and 58 preferably comprise neodymium iron boron, but other suitable permanent magnetic materials may be used. The valve member 42 is preferably constructed of a plastic material, however, the valve member alternatively may be constructed as a PTFE coated steel disc. It should be appreciated by one skilled in the art that any suitable material may be used.

Figure 5:
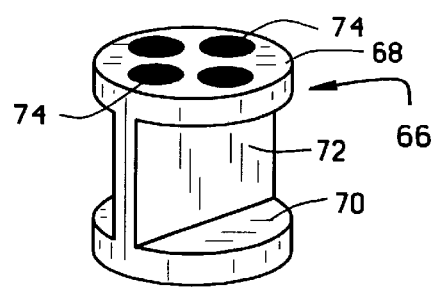
FIG. 5 is a perspective view of another embodiment of a valve member constructed according to the principles of the present invention.
Figure 6:
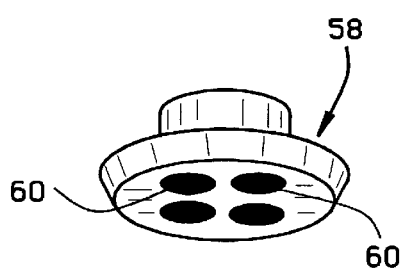
FIG. 6 is a perspective view of a rotating drive mechanism for driving the valve member according to the principles of the present invention.
Figure 7:
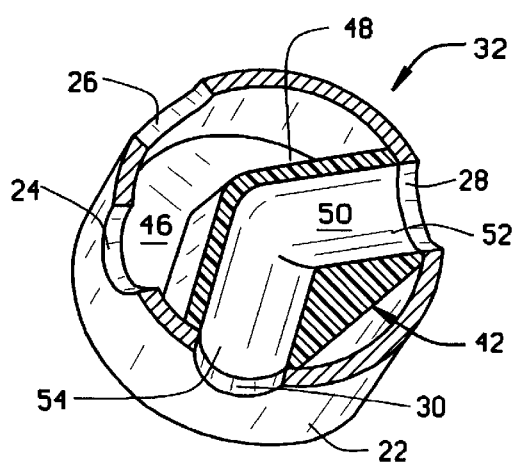
FIG. 7 is a top cross-sectional perspective view of the valve member of FIG. 4.
Figure 10:
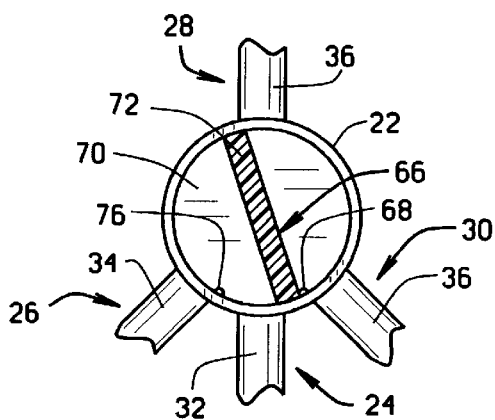
FIG. 10 is a horizontal cross-sectional view of the reversing valve employing the alternate valve member shown in FIG. 5.
Figure 11:
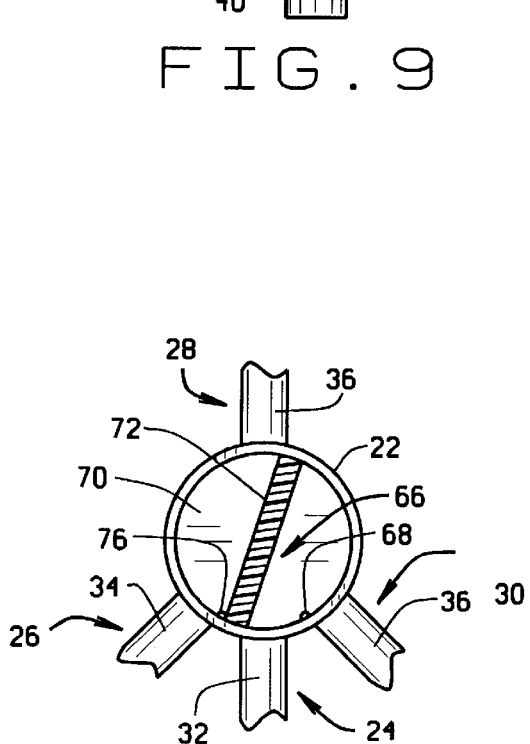
FIG. 11 is a horizontal cross-sectional view of the reversing valve of FIG. 10, with the valve member rotated.

An alternate embodiment of the valve member is indicated as 66 in FIGS. 5, 10 and 11. The valve member 66 is generally disc shaped, with a generally circular top panel 68, a generally circular bottom panel 70, and a body 72, extending transversely across the valve member. The body 72 of the valve member 66 divides the housing 22 into chambers such that in a first position the first inlet port 24 and the second port 26 communicate and the third port 28 and the fourth port 30 communicate (see FIG. 10), and so that in a second position the first inlet port 24 and the fourth port 30 communicate, and the third port 28 and the second port 26 communicate (see FIG. 11).

The valve member 66 is preferably magnetically driven. The valve member 66 is preferably provided with magnets 74 on its top panel, and is sealed in housing 22. The magnets 60 on the driver 58 engage the magnets 74 on the valve member 66. Thus, rotation of the driver 58 outside of the housing 22 over lid 62 causes the valve member 66 to rotate inside the housing. A device for rotating the driver rotates the valve member 66 between its first and second positions. Stops 76 and 78 help prevent over rotation of valve member 56.

To effect a flow reversal, the valve member 42 must be rotated approximately 135° in the preferred embodiment so that the ends of the passage 50 move from connecting the second and third ports 26 and 28 to connecting the third and fourth ports 28 and 30. To effect flow reversals, the valve member 66 must be rotated about 45° in the preferred embodiment to move the chambers formed by the body 72 from connecting first and second ports 24 and 26 and third and fourth ports 28 and 30 to connecting the second and third ports 26 and 28 and the first and fourth ports 24 and 30.

Figure 12:
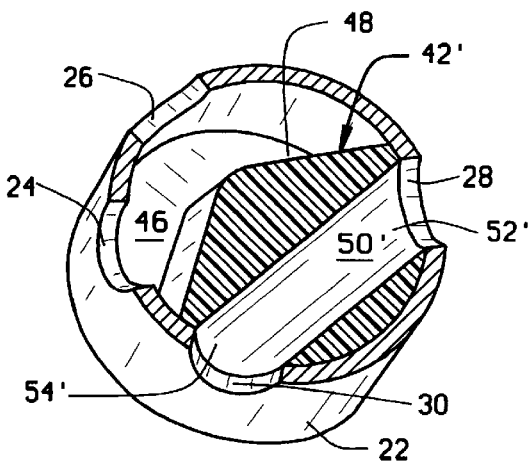
FIG. 12 is a plan view of an alternate construction of the valve member shown in FIGS. 4, 7, 8 and 9.

In contrast to the prior art valves exemplified in FIG. 1, the valve 20 of the present invention does not have a necking down of the flow path or the 180° reversal of flow on the low pressure return. This is achieved by having the angle between the third port 28, which is the low pressure return, and the second and fourth ports 26 and 30 to which the third port 28 is selectively connected, be at least 90°, more preferably 120°, and most preferably 135°. This eliminates the sharp angle in the return flow path of prior art valves. The valve member 42 further improves efficiency by providing a smooth, continuous flow path through passage 50. The passage 50 preferably has substantially the same diameter as the ports 26, 28, and 30 to which it connects, and has a smoothly curved path that does not disturb the low pressure flow between the paths. As shown in FIGS. 4, 7, 8 and 9 the passage 50 in valve member 42 may have a single bend of about 135°. As shown in FIG. 12, an alternate construction of the valve member 42' has a straight passage 50'. Other passage configurations, such as arcuate or curved could also be used.

The valve member 66 likewise eliminates the sharp change of direction in the low pressure return path. While the valve member 66 does not provide a smooth continuous passage like valve members 40 and 40', it only requires a small rotation to change the flow direction.

Appropriate seals between the housing and the valve member are provided to prevent leakage between the two flow paths.

Thus, while the present invention has been described by reference to specific embodiments, it should be understood and apparent to those skilled in the art that modifications and variations of the invention may be constructed without departing from the scope of the invention. It is therefore intended that the invention be limited only by the scope of the claims appended hereto, and their equivalents.

What is claimed is:

1. A four port reversing valve for a reversible-cycle refrigeration system having a compressor, the reversing valve having a first inlet port adapted to be connected to the compressor and second, third, and fourth ports, and a rotatable valve member operable between first and second positions, the valve member in its first position connecting the first inlet port with the second port and the third port with the fourth port, and the valve member in its second position connecting the first inlet port with the fourth port, and the second port with the third port, the second and third ports and the third and fourth ports being arranged so that the third port is oriented at an angle of about 135° with respect to the second and fourth ports.

2. The four port reversing valve according to claim 1 further comprising a rotating drive mechanism, and wherein the valve member is magnetically coupled to rotating drive mechanism.

3. The four port reversing valve according to claim 1 further comprising a linked rotary solenoid connected to the valve member.

4. The four port reversing valve according to claim 1 further comprising a hermetic motor connected to the valve member.

5. The four port reversing valve according to claim 1 wherein the valve member has a smoothly contoured passage therethrough that connects the third port with the fourth port when the valve member is in its first position and that connects the third port with the second port when the valve member is in its second position.

6. The four port reversing valve according to claim 1 wherein the valve member has a passage therein providing a smooth passageway therethrough for connecting the third port with the fourth port when the valve member is in its first position and for connection the third port with the second port when the valve member is in its second position.

7. A four port reversing valve for a reversible-cycle refrigerating system having a compressor, the reversing valve having a first inlet port adapted to be connected to the compressor, and second, third, and fourth ports; a valve member operable between first and second positions, the valve member in its first position connecting the first inlet port with the second port, and the third port with the fourth port, and the valve member in its second position connecting the first inlet port with the fourth port, and the second port with the third port, the third port being oriented at an angle of about 135° with respect to the second and fourth ports.

8. The four port reversing valve according to claim 7 wherein the valve member rotates between its first and second positions.

9. The four port reversing valve according to claim 8 further comprising a linked rotary solenoid connected to the valve member.

10. The four port reversing valve according to claim 8 further comprising a hermetic motor connected to the valve member.

11. Th e four port reversing valve according to claim 7 further comprising a rotating drive mechanism, and wherein the valve member is magnetically coupled to rotating drive mechanism.

12. The four port reversing valve according to claim 7 wherein the valve member has a smoothly contoured passage therethrough that connects the third port with the fourth port when the valve member is in its first position and that connects the third port with the second port when the valve member is in its second position.

13. The four port reversing valve according to claim 7 wherein the valve member has a passage therein providing a smooth passageway therethrough for connecting the third port with the fourth port when the valve member is in its first position and for connection the third port with the second port when the valve member is in its second position.

* * * * *